(12) United States Patent
Hehl

(10) Patent No.: US 8,672,669 B2
(45) Date of Patent: Mar. 18, 2014

(54) ELECTRIC MOTOR DRIVE UNIT FOR AN INJECTION MOLDING MACHINE FOR PROCESSING PLASTICS

(76) Inventors: Karl Hehl, Lossburg (DE); Renate Keinath, legal representative, Balingen (DE)

( * ) Notice: Subject to any disclaimer, the term of this patent is extended or adjusted under 35 U.S.C. 154(b) by 350 days.

(21) Appl. No.: 13/255,987

(22) PCT Filed: Mar. 11, 2010

(86) PCT No.: PCT/EP2010/001556
§ 371 (c)(1),
(2), (4) Date: Sep. 12, 2011

(87) PCT Pub. No.: WO2010/102828
PCT Pub. Date: Sep. 16, 2010

(65) Prior Publication Data
US 2012/0093957 A1    Apr. 19, 2012

(30) Foreign Application Priority Data
Mar. 12, 2009   (DE) .......................... 10 2009 012 482

(51) Int. Cl.
*B29C 45/40*    (2006.01)
(52) U.S. Cl.
USPC ............................ 425/587; 425/583; 425/586
(58) Field of Classification Search
USPC .................... 425/170, 583, 586, 587
See application file for complete search history.

(56) References Cited

U.S. PATENT DOCUMENTS

| | | |
|---|---|---|
| 5,645,868 A | 7/1997 | Reinhart |
| 5,679,384 A * | 10/1997 | Emoto ........................... 425/145 |
| 5,891,485 A * | 4/1999 | Emoto ........................... 425/145 |
| 5,935,494 A * | 8/1999 | Wurl et al. .................... 264/40.1 |
| 6,123,505 A * | 9/2000 | Sasse et al. ................... 415/200 |
| 6,364,650 B1 * | 4/2002 | Emoto ........................... 425/145 |

(Continued)

FOREIGN PATENT DOCUMENTS

| | | |
|---|---|---|
| DE | 19605747 A1 | 8/1997 |
| DE | 19731833 C1 | 1/1999 |

(Continued)

OTHER PUBLICATIONS

Holger Schunk, "Antrieb einer Kunststoffspritzgussmaschine mit nur Motor" Apr. 1, 2004, XP007009592.

(Continued)

*Primary Examiner* — Yogendra Gupta
*Assistant Examiner* — Emmanuel S Luk
(74) *Attorney, Agent, or Firm* — Cantor Colburn LLP

(57) ABSTRACT

The invention relates to an injection molding unit for an injection molding machine for processing plastics, comprising an electro-mechanical dosing motor (D) for rotating a worm conveyor (11) during dosing of the plasticizable material, and an electro-mechanical injection motor (E) for the axial movement of the worm conveyor (11) relative to a plasticization unit (10). The injection motor (E) comprises a spindle drive having a spindle (16). The axes of the dosing motor (D) and of the injection motor (E) are aligned with one another. Due to the spindle (16) of the injection motor (E) being rigidly connected to the rotor (12) of the dosing motor (D) and due to the fact that the dosing motor (D) can be blocked by a braking means in a direction of rotation, an alternative compact, energy-saving injection molding unit is created.

11 Claims, 3 Drawing Sheets

(56) References Cited

U.S. PATENT DOCUMENTS

| | | | |
|---|---|---|---|
| 6,394,780 B1* | 5/2002 | Hehl | 425/145 |
| 6,517,336 B1* | 2/2003 | Emoto et al. | 425/145 |
| 6,530,774 B2* | 3/2003 | Emoto | 425/542 |
| 6,533,572 B1* | 3/2003 | Koide | 425/587 |
| 6,755,636 B2* | 6/2004 | Nishio | 425/145 |
| 6,913,456 B2* | 7/2005 | Dantlgraber | 425/574 |
| 7,033,158 B2* | 4/2006 | Becker et al. | 425/150 |
| 7,090,477 B2* | 8/2006 | Hsu et al. | 425/3 |
| 7,112,057 B2* | 9/2006 | Dantlgraber | 425/574 |
| 7,112,902 B2* | 9/2006 | Schunk et al. | 310/90 |
| 7,124,581 B2* | 10/2006 | Dantlgraber | 60/560 |
| 7,147,450 B2* | 12/2006 | Kasai et al. | 425/145 |
| 7,234,928 B2* | 6/2007 | Emoto et al. | 425/145 |
| 7,270,523 B2* | 9/2007 | Schmidt | 425/145 |
| 7,291,297 B2* | 11/2007 | Weatherall et al. | 264/40.1 |
| 7,329,373 B2* | 2/2008 | Nishio | 264/40.1 |
| 7,442,022 B2* | 10/2008 | Konno et al. | 425/150 |
| 8,075,296 B2* | 12/2011 | Taniguchi | 425/145 |
| 8,075,817 B2* | 12/2011 | Yamada | 264/40.1 |
| 2002/0168445 A1* | 11/2002 | Emoto et al. | 425/558 |
| 2003/0175380 A1* | 9/2003 | Dantlgraber | 425/589 |
| 2004/0013764 A1* | 1/2004 | Dantlgraber | 425/574 |
| 2004/0018270 A1* | 1/2004 | Becker et al. | 425/587 |
| 2004/0071810 A1* | 4/2004 | Hsu et al. | 425/162 |
| 2004/0096534 A1* | 5/2004 | Shiraishi et al. | 425/159 |
| 2004/0161485 A1* | 8/2004 | Kobayashi | 425/3 |
| 2004/0173925 A1* | 9/2004 | Melkus | 264/40.5 |
| 2004/0228944 A1* | 11/2004 | Kasai et al. | 425/587 |
| 2006/0093694 A1* | 5/2006 | Malwitz | 425/145 |
| 2006/0145396 A1* | 7/2006 | Okada et al. | 264/328.1 |
| 2006/0153946 A1* | 7/2006 | Schmidt | 425/582 |
| 2006/0193943 A1* | 8/2006 | shiraishi et al. | 425/587 |
| 2007/0009630 A1* | 1/2007 | Okada | 425/587 |
| 2007/0020354 A1* | 1/2007 | Dantlgraber | 425/574 |
| 2008/0166446 A1* | 7/2008 | Okada | 425/587 |
| 2009/0040862 A1* | 2/2009 | Knauff et al. | 366/78 |
| 2011/0206797 A1* | 8/2011 | Taniguchi | 425/587 |

FOREIGN PATENT DOCUMENTS

| | | | | |
|---|---|---|---|---|
| DE | 19831482 C1 | 1/2000 | | |
| DE | 10222748 C1 | 5/2003 | | |
| DE | 102004023837 B3 | 8/2005 | | |
| DE | 102006007438 B3 | 7/2007 | | |
| DE | 102007027212 A1 | 12/2008 | | |
| DE | 102008037102 A1 * | 2/2010 | | B29C 45/50 |
| EP | 0576925 A1 | 1/1994 | | |
| EP | 1162053 A2 | 12/2001 | | |
| EP | 1219403 A1 | 7/2002 | | |
| EP | 002186616 A1 * | 5/2010 | | B29C 45/50 |
| JP | 410235696 A * | 9/1998 | | B29C 45/50 |
| JP | 02009113403 A * | 5/2009 | | B29C 45/50 |
| JP | 02009241435 A * | 10/2009 | | B29C 45/50 |
| JP | 02011161679 A * | 8/2011 | | B29C 45/50 |
| WO | 0189799 A1 | 11/2001 | | |
| WO | 2008052959 A1 | 5/2008 | | |
| WO | WO2009111992 A * | 9/2009 | | B29C 45/50 |

OTHER PUBLICATIONS

International Search Report PCT/EP2010/001556; Dated Jul. 6, 2010.

* cited by examiner

ELECTRIC MOTOR DRIVE UNIT FOR AN INJECTION MOLDING MACHINE FOR PROCESSING PLASTICS

CROSS REFERENCE TO RELATED APPLICATIONS

The present application claims the priority of the German patent application 10 2009 012 482.9 which was filed on Mar. 12, 2009 and the disclosure content whereof is hereby expressly incorporated as subject matter of the present application.

TECHNICAL FIELD

The invention relates to an injection molding unit for an injection molding machine for the processing of plastics materials and other plasticizable materials such as powdery or ceramic masses

BACKGROUND

An injection molding unit of this type is known from DE 198 31 482 C1, wherein a plane of separation is provided therein between an injection motor and a dosing motor, said plane serving to separate the spheres of influence of the two electromechanical drives from each other. An electric motor incorporating a rotor and a stator can be used as the dosing motor. The injection motor which is located behind the dosing motor as seen from the plasticizing unit is formed by a spindle drive means which is mounted on a supporting element. The injection bridge carrying the two motors is guided on spars which form a framework of forces via the supporting element for the spindle drive means at the rear.

WO 2008/052959 A1 discloses a compactly built drive device for an injection molding machine comprising an electromechanical injection motor and an electromechanical dosing motor. The two hollow-shafted motors act on a shaft that is common to the motors. Consequently, for the purposes of the injection molding process, this drive device together with the driven dosing motor must form a counter hold means for the injection motor. In consequence, the dosing motor not only has to be dimensioned to support a larger torque than is actually necessary, but the total energy consumption of the system also rises.

From EP 0 576 925 A1, there is known an injection molding unit wherein two liquid-cooled servo motors for driving the nozzles i.e. for placing the injection molding unit on a mould carrier and for the injection process are arranged one behind the other with their effective axes aligned with one another. The dosing motor, with which the rotation of the conveying means i.e. the feed screw is effected, is mounted on a separate supporting element.

DE 10 2006 007 438 B3 discloses a drive means for an injection molding unit which comprises just one hollow shafted motor and, where necessary, an auxiliary drive means for the metering and injection processes. Mounted within the hollow shafted motor are two shafts which can also convert axial movements by means of a spline-shaft coupling. The dosing and injection processes are effected serially in alternating manner using one and the same hollow shafted motor. In order to separate the movements from one another, the zones of influence of the two parts of the motor are separated from each other by an axial bearing in the driven shaft. In addition, a free-wheel device is provided in the front part of the hollow shafted motor for the movement required purely for dosing purposes and it can be operated in conjunction with a braking means when the injection process is being effected by the rear part of the hollow shafted motor.

DE 10 2007 027 212 A1 proposes a drive device for an injection molding unit wherein a drive spindle for the dosing and injection processes has a threaded section which is in engagement with a driven spindle nut. A further spindle, which is rotatable by an associated drive motor, cooperates with the drive spindle. The two spindles are coupled to one another by a threaded connection for operational purposes.

BRIEF SUMMARY

Based upon this state of the art, the invention provides an alternative, compact and energy saving injection molding unit.

In this arrangement, the fixed connection between mutually adjacent motors that is known from the state of the art is eliminated although the spindle of the injection motor is rigidly connected directly to the dosing motor, namely, to the rotary part of the dosing motor. Nevertheless, in order to allow a partial power-decoupled movement of the two motors, the dosing motor is blocked in one direction of rotation by a free-wheel device. This results in a mechanically simple structure which nevertheless meets the necessary requirements for the production of molded parts and which also uncouples the torque on the dosing motor that is applied by the movement for the injection process in powerless manner.

The free-wheel device is supported in the housing of the dosing motor which, for its part, is preferably mounted in an injection bridge upon the flanks of which are mounted the spars by means of which the injection molding unit is arranged to be placed on the mould closure unit. Thus, in the case of the free-wheel blocking, this results in an adequate supporting element by means of the outer guidance means so that the torque-countering means for the injecting spindle can be applied passively and thus in energy-saving manner during the movement for the injection process whereat the largest forces, referred to as moments, are effective.

Since the two motors are preferably supported at the rear on a supporting element, the dynamic pressure and the injection pressure can be measured there in a reliable and expedient manner by force measuring instruments in the form of a force measuring diaphragm for example.

Further advantages are apparent from the appendant Claims and the following description.

BRIEF DESCRIPTION OF THE FIGURES

The invention is explained hereinafter in more detail with the aid of an exemplary embodiment that is illustrated in the Figures. Therein.

DETAILED DESCRIPTION

Figure 1:
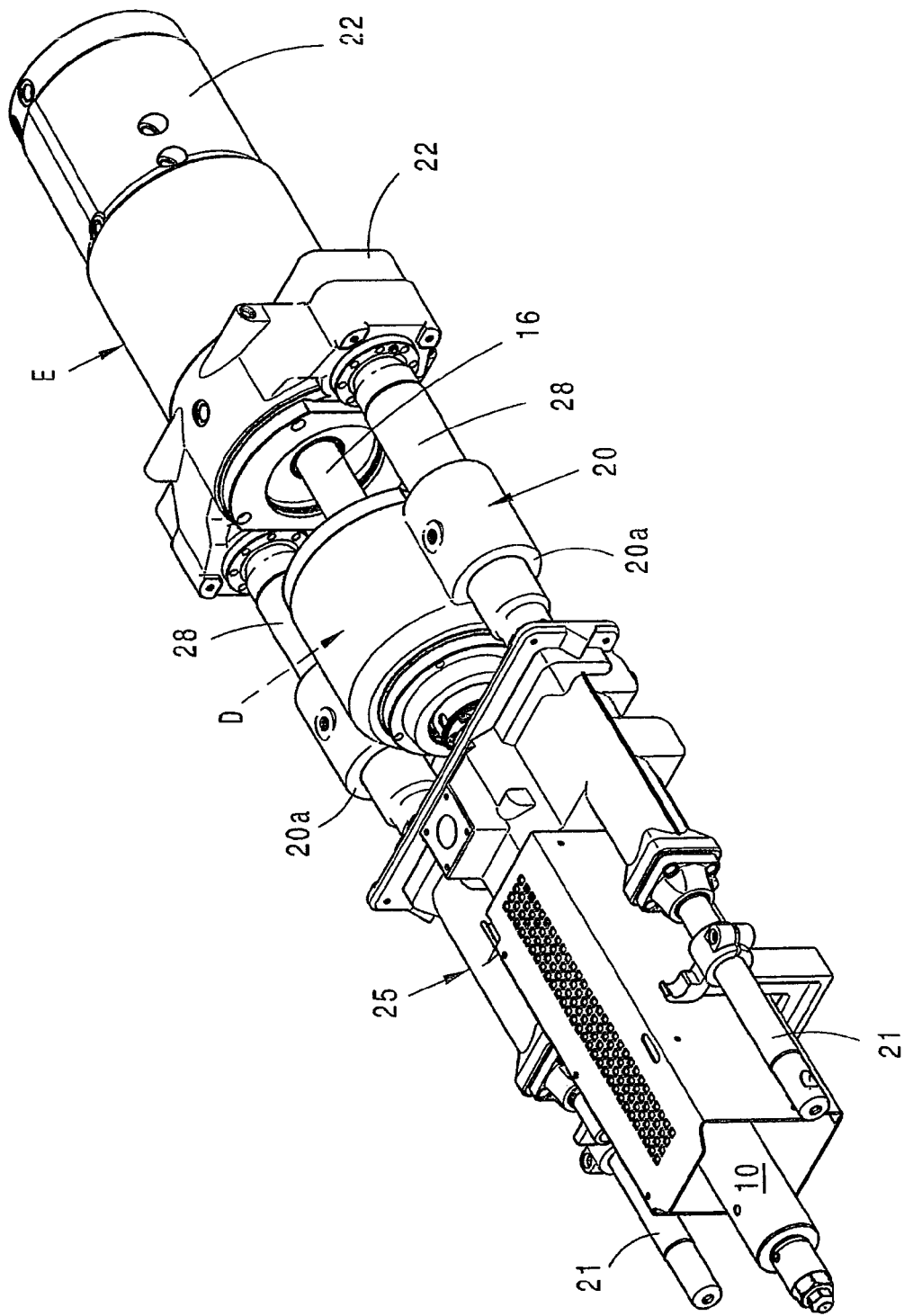
FIG. 1 shows a three-dimensional view of the injection molding unit.

The invention will now be described in more detail and in exemplary manner with reference to the accompanying drawings. However, the exemplary embodiments are merely examples which are not intended to restrict the inventive concept to a certain arrangement. Before the invention is described in detail, it should be pointed out that it is not restricted to the respective components of the device nor the respective method steps since these components and methods can vary. The terms used here are only intended to describe special embodiments and are not used in a restrictive sense. In addition, if the singular or indefinite articles are used in the description or in the claims, they also refer to a plurality of these elements insofar as the general context does not make it unambiguously clear that something else is meant.

The Figures show an injection molding unit for an injection molding machine for processing plastics materials and other plasticizable materials such as powdery or ceramic masses. The injection molding unit is of substantially conventional construction i.e. it incorporates a dosing motor D, an injection motor E and a nozzle driving unit 25. The injection molding unit is placed on a mould carrier 26 and a sprue for a mould cavity 24 in an injection mould M by means of the nozzle driving unit 25 which, in the exemplary embodiment, is formed by a piston and cylinder unit whereof the piston is mounted on the spars 21. Other types of drive system for the nozzle driving unit are conceivable. The electromechanical dosing motor D serves to rotate the feed screw 11 when dosing the plasticizable material. The feed screw 11 initially conveys the plasticizable material into a space in front of the feed screw in order to subsequently inject the plasticized material into the mould cavity 24 of the injection mould M during the injection process by an axial movement of the feed screw relative to a plasticizing unit. For this purpose, the plasticizing unit 10 is mounted in the injection molding unit by means of a supporting element 27. The electromechanical dosing motor D has a rotor 12 and a stator 13, whereby, in accordance with FIG. 3, the feed screw 11 is rigidly coupled, both axially and radially, to the rotor of the dosing motor over a connecting range.

The electromechanical injection motor E is provided for the axial movement of the feed screw 11. The injection motor E has a spindle drive including a spindle 16 which is connected operationally to the spindle by a spindle nut and is mounted in a supporting element 22.

Figure 2:
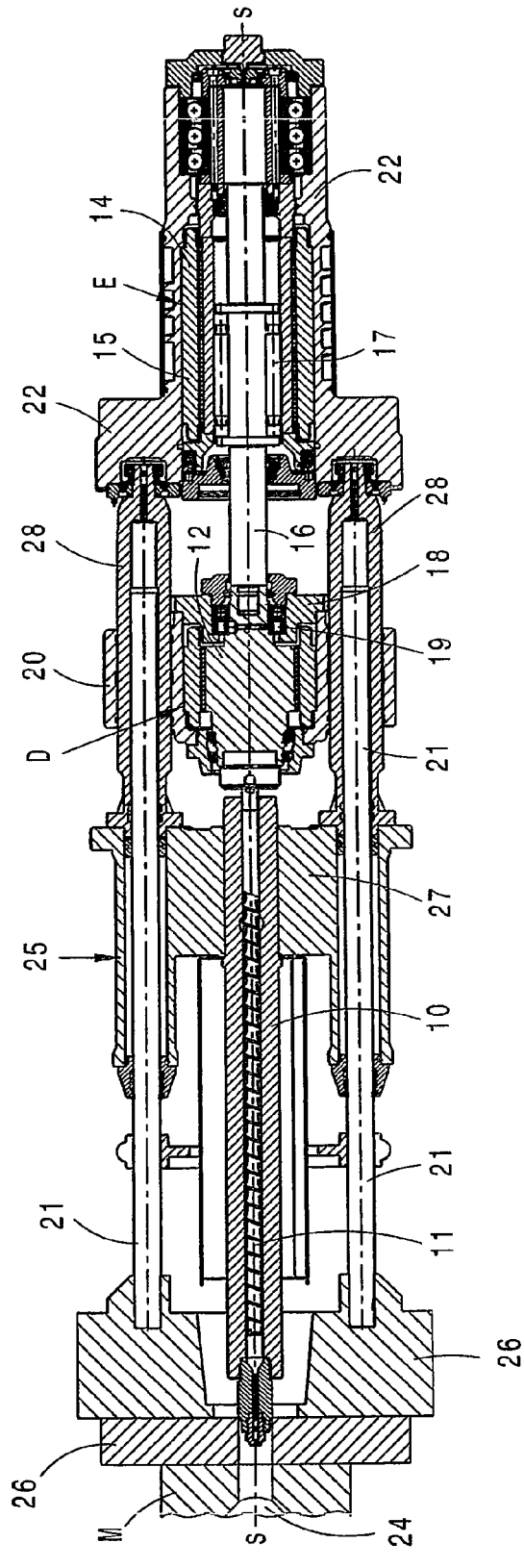
FIG. 2 a horizontal section through the injection molding unit at the level of a feed screw and spars with a schematically illustrated mould closure unit, FIG. 3 an enlarged excerpt from FIG. 2 in the region of the dosing motor and the injection motor.
Figure 3:
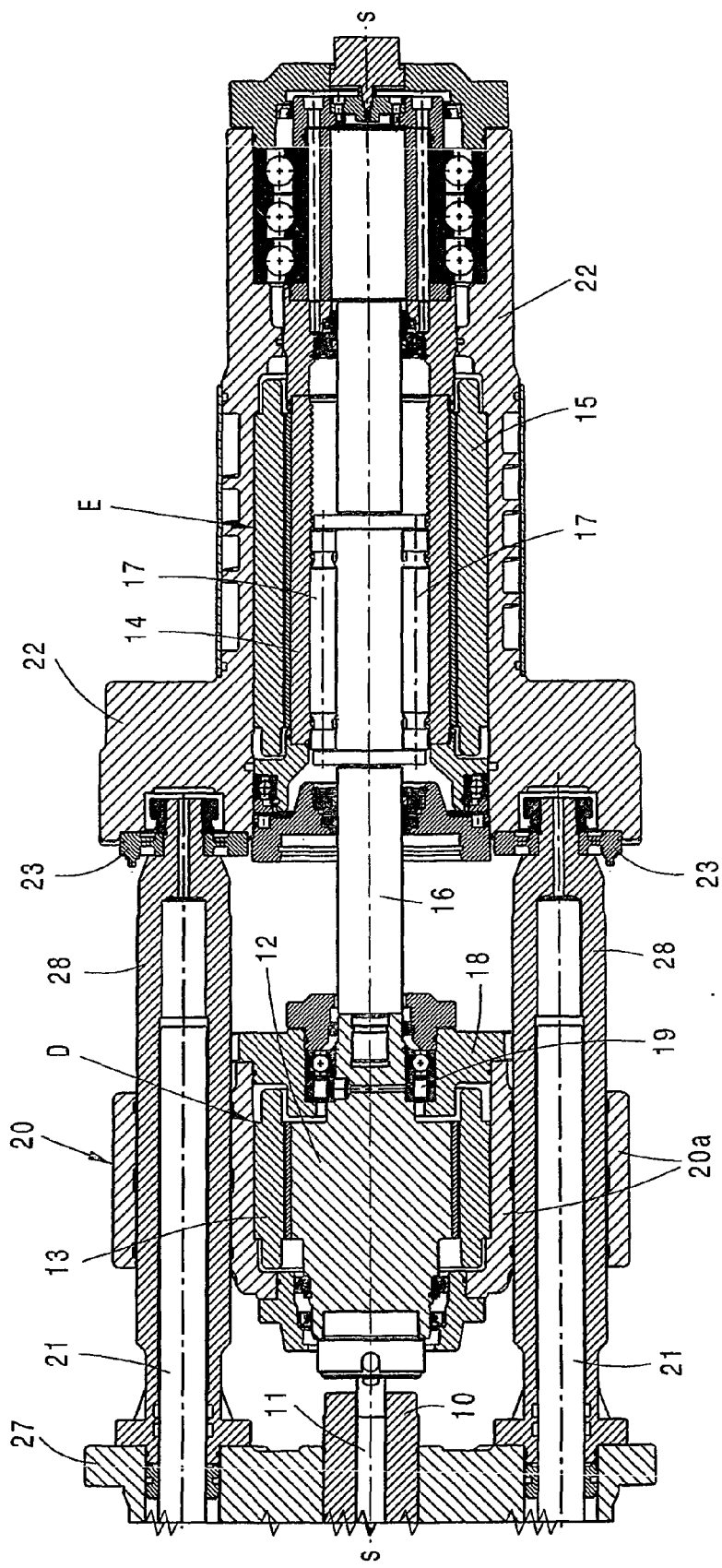

In accordance with FIGS. 2 and 3, the axes of the dosing motor D and the injection motor E are in alignment with one another. The spindle 16 of the injection motor E is rigidly connected to the rotor 12 of the dosing motor so that, in principle, the rotational movement of the rotor 12 of the dosing motor also leads to a rotational movement of the spindle 16 and vice versa. The spindle 16 can now converts a rotary force or movement into a linear force or movement if, in correspondence with the spindle pitch thereof, a rotary torque-supporting-process which corresponds to the desired feeding force is provided. For the purposes of providing this torque support, a free-wheel device 19 serving as a braking means is integrated into the dosing motor D in the preferred direction of force "injection", whereas, for the reverse direction of the feed screw, the braking action is supplied actively by the dosing motor itself. The braking means is provided in order to decouple the movement of the injection motor from the dosing motor and, in the exemplary embodiment, it is formed by the free-wheel device 19 which blocks or can block the dosing motor D in one direction of rotation, i.e. it forms a unidirectional rotation-prevention means. The free-wheel device 19 is mounted in the cover 18 of the dosing motor D. For its part, in accordance with FIG. 3, this cover is in turn mounted in the injection bridge 20 which is movable axially along the injection axis s-s by the movement of the injection motor E. The injection axis s-s of the injection molding unit is likewise in alignment with the axes of the dosing motor D and the injection motor E.

The spars 21, by means of which the injection molding unit is supported on a mould carrier 26, are mounted on the flanks 20a of the injection bridge 20 which project outwardly from the dosing motor D. These spars are connected at the rear to the supporting element 22 which, for its part, forms the counter bearing for the injection drive. The supporting element 22 is thus located behind the dosing motor D as seen from the plasticizing unit 10. The stator 15 of the injection motor E which, in operation, drives the rotor 14 that is provided with an internal thread, is mounted in the aforementioned supporting element. Planetary gears 17 are in operational engagement with the internal thread of the rotor 14 and, for their part, the external threads of the planetary gears are in contact with the external thread of the spindle 16. The injection motor E is formed by a hollow shafted motor through which the spindle 16 passes. The nut of the spindle drive means which serves to produce the injection movement is mounted in the rotor 14 of the injection motor or, as in the exemplary embodiment, it is formed by the rotor 14 of the injection motor.

The supporting element 22 and the connecting elements 28 in which the spars 21 are partially accommodated form a framework of forces, whereby force measuring instruments 23 are provided in the transition region between the connecting elements 28 and the supporting element 22 for the purposes of measuring the back pressure and the injection pressures in particular. The force measuring instrument can preferably be formed by force measuring diaphragms.

The device works as follows:

In the exemplary embodiment, the axial movement of the feed screw is produced by the spindle 16 of the injection drive by means of the rotation of the driven spindle nut 14. The spindle can only produce an axial to-and-fro force if it experiences a torque opposing force corresponding to its spindle transmission ratio. This torque opposing force is created in the main direction of force of the injection movement by the dosing motor D integrated in the housing of the dosing motor. For the backward motion of the feed screw, the torque opposing force is applied by actively passing an appropriately actively regulated flow of current through the dosing motor.

It is self evident that this description may be subjected to the most diverse modifications, changes and adaptations which fall within the scope of equivalents to the accompanying Claims.

The invention claimed is:

1. An injection molding unit for an injection molding machine for processing of plastics materials and other plasticizable materials, such as powdery or ceramic masses, comprising
a plasticizing unit that can be accommodated in the injection molding unit and in which there is provided a feed screw for conveying the plasticizable material into a mold cavity of an injection mold,
an electromechanical dosing motor for rotating the feed screw when dosing the plasticizable material comprising a rotor and a stator,
an electromechanical injection motor for axial movement of the feed screw relative to the plasticizing unit,
wherein the injection motor comprises a spindle drive having a spindle and a nut cooperating therewith,
wherein axes of the dosing motor and the injection motor are aligned with one another,
wherein the spindle of the injection motor is axially and radially rigidly connected to the rotor of the dosing motor and the dosing motor is blockable in one direction of rotation by a free-wheel device mounted in a housing of the dosing motor.

2. An injection moulding unit in accordance with claim 1, wherein the feed screw is axially and radially rigidly coupled with the rotor of the dosing motor and wherein the feed screw, the rotor and the spindle rotate in common.

3. An injection molding unit in accordance with claim 1, wherein an injection axis of the injection molding unit is aligned with axes of the dosing motor and the injection motor.

4. An injection molding unit in accordance with claim 1, wherein the dosing motor is mounted in an injection bridge in which spars for supporting the injection molding unit on a mold carrier for the injection mold are mounted in flanges of the injection bridge, the flanges projecting outwardly as seen from the dosing motor.

5. An injection molding unit in accordance claim 1, wherein a housing of the injection motor is mounted on a supporting element as torque opposing force for the freewheel drive which supporting element is located behind the dosing motor as seen from the plasticizing unit.

6. An injection molding unit in accordance claim 1, wherein the injection motor is formed by a hollow shafted motor through which the spindle extends.

7. An injection molding unit in accordance with claim 1, wherein the nut of the spindle drive of the injection motor is mounted in the rotor of the injection motor or is formed by the rotor of the injection motor.

8. An injection molding unit in accordance with claim 1, wherein a planetary drive is accommodated in the injection motor.

9. An injection molding unit in accordance with claim 1, wherein a supporting element and connecting elements provided between the supporting element and the injection bridge form a framework of forces.

10. An injection molding unit in accordance with claim 9, wherein force measuring instruments are provided on the connecting elements for the purposes of measuring back pressure and injection pressure in particular.

11. An injection molding unit in accordance with claim 10, wherein the force measuring instruments are formed by force measuring diaphragms.

\* \* \* \* \*